(12) United States Patent
Fauter

(10) Patent No.: US 11,603,271 B2
(45) Date of Patent: Mar. 14, 2023

(54) DIVERSION DEVICE FOR PRODUCTS

(71) Applicant: MULTIVAC SEPP HAGGENMUELLER SE & CO. KG, Wolfertschwenden (DE)

(72) Inventor: Christian Fauter, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 17/562,770

(22) Filed: Dec. 27, 2021

(65) Prior Publication Data
US 2022/0204281 A1 Jun. 30, 2022

(30) Foreign Application Priority Data
Dec. 30, 2020 (DE) .......................... 102020135131.3

(51) Int. Cl.
| | |
|---|---|
| *B65G 47/08* | (2006.01) |
| *B65G 47/52* | (2006.01) |
| *B65G 47/68* | (2006.01) |
| *B65G 13/10* | (2006.01) |

(52) U.S. Cl.
CPC ........... *B65G 47/082* (2013.01); *B65G 47/52* (2013.01); *B65G 47/683* (2013.01); *B65G 13/10* (2013.01)

(58) Field of Classification Search
CPC .... B65G 47/082; B65G 47/52; B65G 47/683; B65G 13/10; B65G 47/82
USPC .......................................... 198/370.1, 457.07
See application file for complete search history.

(56) References Cited

U.S. PATENT DOCUMENTS

| | | | | |
|---|---|---|---|---|
| 1,489,926 A | * | 4/1924 | Burtchaell | B65G 47/80 198/457.01 |
| 2,602,531 A | * | 7/1952 | Plank | B65G 47/846 198/441 |
| 3,710,937 A | * | 1/1973 | Cook | B07C 5/122 209/523 |

(Continued)

FOREIGN PATENT DOCUMENTS

| | | |
|---|---|---|
| DE | 26 11 354 A1 | 9/1977 |
| DE | 10 2004 060640 A1 | 7/2006 |

(Continued)

OTHER PUBLICATIONS

European Search Report (with English Machine Translation) dated May 13, 2022, Application No. 21217008.8-1012, Applicant MULTIVAC Sepp Haggenmueller SE & Co. KG, 26 Pages.

(Continued)

*Primary Examiner* — James R Bidwell
(74) *Attorney, Agent, or Firm* — Brooks Kushman P.C.

(57) ABSTRACT

The disclosure relates to a diversion device for a transport device for transporting products. The diversion device comprises a first element mounted to be rotatable about a first axis of rotation and a second element mounted to be rotatable about a second axis of rotation, where the axes of rotation form an angle with one another and the first and the second elements overlap in a region so that the first and the second elements enclose a diversion region. A product supplied to the diversion region can be diverted in the diversion region by rotating the first and the second elements and can exit the diversion device after having passed the diversion region due to mass inertia.

18 Claims, 5 Drawing Sheets

(56) References Cited

U.S. PATENT DOCUMENTS

| | | | | |
|---|---|---|---|---|
| 4,437,560 A | * | 3/1984 | Wolf | B65G 47/846 |
| | | | | 198/457.03 |
| 4,549,647 A | * | 10/1985 | Cosse | B65G 47/5131 |
| | | | | 198/594 |
| 7,784,600 B2 | | 8/2010 | Weber | |
| 8,297,434 B2 | | 10/2012 | Cocchi et al. | |
| 2011/0056802 A1 | * | 3/2011 | Cocchi | B65G 47/80 |
| | | | | 198/602 |

FOREIGN PATENT DOCUMENTS

| | | | | |
|---|---|---|---|---|
| GB | 1 444 929 A | | 8/1976 | |
| JP | 2006290595 A | | 10/2006 | |
| WO | 2009/141283 | * | 11/2009 | B65G 47/80 |

OTHER PUBLICATIONS

German Search Report dated Sep. 13, 2021, Application 10 2020 135 131.3, Applicant MULTIVAC Sepp Haggenmueller SE & Co. KG, 5 Pages.

* cited by examiner

DIVERSION DEVICE FOR PRODUCTS

CROSS-REFERENCE TO RELATED APPLICATIONS

This application claims foreign priority benefits under 35 U.S.C. § 119(a)-(d) to German patent application number DE 10 2020 135 131.3, filed Dec. 30, 2020, which is incorporated by reference in its entirety.

TECHNICAL FIELD

The present disclosure relates to a diversion device for a transport device for transporting products, as well as to a transport line for transporting products and a packaging machine for packaging products, and to a method for packaging products.

BACKGROUND

Transport devices for transporting products are known from prior art. They typically comprise conveyor belts for transporting products that may not have a fixed shape or size (such as sausages or other foods). The conveyor belts are typically configured to comprise one or more driven belts. This allows for reliable transportation, but usually requires that the transportation only be conducted in a straight line. Conveyor belts having a curved shape and therefore being able to transport the products on curved paths are mostly expensive and require much space due to the radius of curvature that can be achieved.

In the setup of production systems, this results in restrictions with regard to the spatial arrangement of treatment machines for the products.

SUMMARY

Proceeding from known prior art, a technical object to be satisfied is therefore to specify a diversion device for a transport device for transporting products with which reliable diversion of products from a first to a second direction of transport can be effected and space can be saved at the same time.

This object may be satisfied by a diversion device for a transport device for transporting products according to the disclosure, a transport line for transporting products according to the disclosure, as well as a packaging machine for packaging products according to the disclosure, and a method for packaging products according to the disclosure.

The diversion device according to the disclosure for a transport device for transporting products comprises a first element mounted to be rotatable about a first axis of rotation and a second element mounted to be rotatable about a second axis of rotation, where the axes of rotation form an angle with one another and the first and the second element overlap in a region so that the first and the second element enclose a diversion region, where a product supplied to the diversion region can be diverted in the diversion region by rotating the first and the second element and can exit the diversion device after having passed the diversion region due to mass inertia.

The diversion region is presently to be understood to be a region in which the products are diverted, where they move due to the interaction with at least one of the first or the second element from a first direction of motion (or first direction of transport) to a second direction of motion (or second direction of transport) which forms an angle with the first direction of motion. This is achieved in that the products, while they are caused by the first and/or the second element to perform a motion to follow the rotation of these elements at least in the diversion region, cannot exit the diversion region due to their mass inertia because the diversion region of the first and the second element is enclosed in this region due to their overlap such that products cannot exit the diversion region. As a result, the centripetal force acting upon the products during the motion along the diversion region can effect a diversion. Outside and downstream of the diversion region, the first and the second element then no longer overlap so that the products due to their inertia can no longer follow the rotation of the first and the second element and exit the diversion device.

The size of the diversion region and therefore also the diversion angle between the first direction of motion and the second direction of motion of the products can be determined by the geometry of the first and the second element and/or the angle formed between the axes of rotation of the first and the second element.

In particular, the first axis of rotation and the second axis of rotation (or imaginary extensions thereof) intersect at a point.

Reliable diversion of products can be realized in a small space with this diversion device because forces acting upon the products cannot cause an exit from the diversion region even at high transport speeds and with a small spacing between the products from the axis of rotation. This can, firstly, save space and, secondly, also advantageously save costs for transport systems.

It can be provided that the first element is circular disk-shaped and the second element comprises an inner frustoconical surface, where the first element in the diversion region engages with the frustoconical surface.

The frustoconical surface does not have to correspond exactly to the shape of a truncated cone. For example, the lateral surface of the truncated cone can also have curvatures or form no edges with the base surface and/or the top surface, but instead continuously transition thereto (for example by segments of a circle instead of the edges). For example, the lateral surface and/or the top surface and/or the base surface can be configured as a surface that, in a cross section parallel to the axis of symmetry of the truncated cone, comprises one or more concavely curved and/or convexly curved sections or elements.

The circular disk-shaped element can be configured in particular such that its diameter is greater than the height of the circular disk. For example, the diameter of the circular disk-shaped first element can be five times greater than its height. A circular disk-shaped element should presently not only comprise such implementations that do not comprise an opening disposed within the circular disk. Also comprised are elements that have a central opening, for example, for passing an axis of rotation, and/or have additional openings in the region of the circular disk in order, for example, to reduce its weight. A configuration corresponding exactly to a circular disk is presently also not mandatory. For example, the circular disk-shaped element can also exhibit irregularities on its surface in order, for example, to increase the friction between the surface and a product. Other deviations from the exact shape of a circular disk are presently also conceivable as long as the basic structure characterizing the basic shape of the first element is the shape of a circular disk or is similar to a circular disk. The circular disk-shaped first element can also comprise a circumferential notch or groove on its lateral surface in which products can be transported, where the second element then preferably is able to engage around this groove so that a diversion region is enclosed.

The frustoconical inner surface of the second element can preferably be formed such that that the large and the small diameter of the truncated cone are greater than the height of the truncated cone which forms the inner surface. For example, it can presently also apply that at least the greater diameter or both the greater and the smaller diameter are at least five times greater than the height of the truncated cone. By configuring the second element with an inner surface that represents a truncated cone, the first element can be reliably enclosed in the form of a circular disk so that products cannot unintentionally exit the diversion region and a reliable motion of the products through the diversion region is possible at the same time.

Furthermore, it can be provided that the first element comprises two circular disk-shaped segments which are arranged concentrically to one another and spaced from one another along the first axis of rotation and which are mounted to be rotatable about the first axis of rotation, where a product can be received between the segments and be transported through the diversion device and where the frustoconical surface of the second element encloses the two segments in the diversion region. The two circular disk-shaped segments spaced from one another do not necessarily have to be separate segments. They can also be connected to one another, for example, by the common axis of rotation or another connecting element. For example, the first element can be configured as a cylinder with circular disk-shaped segments extending along the top surface and along the base surface of the cylinder (for example in the sense of an element with a double-T cross section).

The spacing between the circular disk-shaped segments can be selected in particular such that products can be transported between the circular disk-shaped segments. Reliable transportation of products can thus be ensured in connection with the configuration of the second element.

It is provided in one embodiment that an angle between the first axis of rotation and a lateral surface of the inner frustoconical surface of the second element in at least a partial region of the diversion region is between 0° and 20°, preferably between 0° and 5°. This prevents products from tilting, for example, in a contact region or in the overlap region between the first element and the second element so that reliable transportation of products is possible even at high rotational speeds.

In one embodiment, the first element is driven to rotate about the first axis of rotation by a first drive device and the second element is driven to rotate about the second axis of rotation by a second drive device that is independent of the first drive device. Independent drives can thus reliably implement the motion of the first element and the second element even with the present tilt of the axes of rotation. In addition, the angular velocities of the first element and the second element can be coordinated reliably in this way.

It can alternatively be provided that the first element and the second element are driven by a common drive device for rotation about the first and the second axis of rotation. This can reduce the complexity of the rotation device.

In particular, it can be provided that the first drive device and the second drive device can drive the first element and the second element at the same rotational speed. The same rotational speed ensures that the products transported with the diversion device experience no or only small undesirable torques and then assume incorrect positions during the transportation through the diversion device.

It can further be provided that the first element and/or the second element comprises a surface made of stainless steel that comes into contact with the product. This configuration is structurally simpler for the use of two independent drive devices and can then advantageously reduce the complexity of the diversion device and its susceptibility to defects.

It can be provided in one embodiment that the first element and/or the second element comprise a surface made of stainless steel that comes into contact with the product. Impurities or unintentional contamination of the products can then be prevented.

It can further be provided that the diversion region enclosed by the first element and the second element is configured such that a product that enters the diversion region along a supply direction exits the diversion region in a discharge direction, where an angle between the supply direction and the discharge direction is between 45° and 135°, or between 60° and 120°, or between 85° and 95°.

The angle between the supply direction and the discharge direction can advantageously be set by the angle that the axes of rotation of the first element and the second element form. The smaller this angle, the greater the angle between the supply direction and the discharge direction. This angle can also be variably adjustable so that the same diversion device can also be used in different configurations and/or arrangements of transport devices and the respective angle between the discharge direction and the supply direction can be set as required.

According to the disclosure, a transport line for transporting products can also be provided, where the transport line comprises a first transport device for transporting products along a first direction of transport, a second transport device for transporting products along a second direction of transport, and a diversion device according to one of the preceding embodiments arranged between the first and the second transport device, where the first transport device can supply products to the diversion device and the diversion device can divert products from the first direction of transport to the second direction of transport and supply them to the second transport device. This transport line can be configured to be more compact so that space in the production system can be saved.

It can be provided that the first and/or the second transport device comprise a V-shaped conveyor belt. V-shaped conveyor belts are typically used for products that do not have a fixed predetermined shape or at least not all have the same shape and are possibly flexible in shape, such as sausages. Reliable transport to and/or away from the diversion device is effected with this embodiment.

It can be provided in a further embodiment that the second transport device comprises a sliding region extending along the second direction of transport for receiving products from the diversion device and a compartmentalized conveyor belt downstream of the sliding region, where products pass from the sliding region to the compartmentalized conveyor belt and can be transported in the compartmentalized conveyor belt along a third direction of transport. In the compartmentalized conveyor belt, the products can be, for example, placed in suitable receiving troughs in the compartmentalized conveyor belt and then transported onward. The third direction of transport can form an angle not equal to zero with the second direction of transport, in particular run transverse to the second direction of transport.

A packaging system for packaging products is also provided according to the disclosure, where the packaging system comprises a treatment machine for products and a packaging machine for packaging products and a transport line according to one of the preceding embodiments downstream of the treatment machine and upstream of the packaging machine. Downstream directions are to be understood to mean in the direction of the direction of transport of the products, and upstream directions correspondingly in a direction opposite to the direction of transport. This embodiment implements a packaging system with reduced space requirements for the transport lines between adjacent machines, in particular the treatment machine and the packaging machine.

It can be provided that the treatment machine is or comprises a centrifuge. Centrifuges can presently be considered, for example, for separating products such as sausages. With this configuration, the packaging system is configured for specific employment in the food industry.

A method for transporting products is also according to the disclosure, where the products are diverted from a first direction of transport to a second direction of transport by way of a diversion device according to one of the preceding embodiments. This method realizes efficient transportation of products with shortened transport routes.

DETAILED DESCRIPTION

Figure 1:
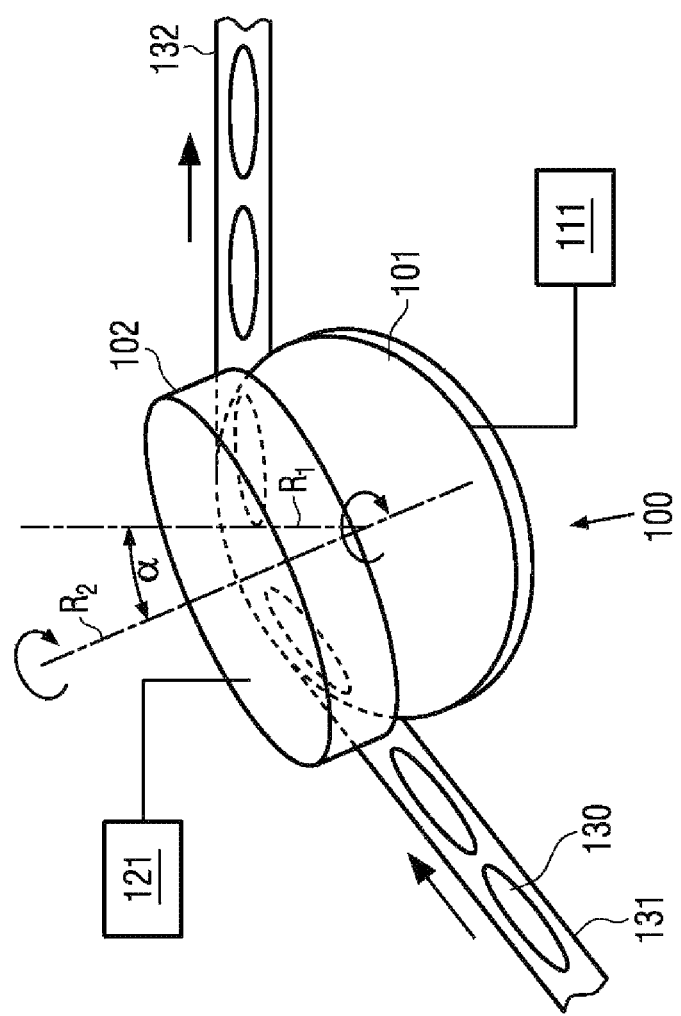
FIG. 1 shows a schematic view of a diversion device according to an embodiment in connection with transport devices.

FIG. 1 shows a diversion device 100 according to an embodiment in connection with a first transport device 131 arranged in the direction of transport upstream of the diversion device and a second transport device 132 arranged downstream of diversion device 100. These devices 100, 131 and 132 together can be considered to be a transport line. All of the embodiments mentioned hereafter with regard to the diversion device can also be applied to a corresponding transport line.

Diversion device 100 according to embodiments of the disclosure is configured and arranged to divert in their direction of motion products 130 which it was supplied, for example, from first transport device 131, and to supply them to second transport device 132, the direction of transport of which can differ from the direction of transport of first transport device 131.

Transport devices 131, 132 can be configured as conveyor belts. In particular, one of transport devices 131, 132 or both can be configured as a V-shaped conveyor belt which comprises two conveyor belts arranged at an acute angle to one another, where products 130 can be transported in the trough thus formed between these conveyor belts. Products 130 can be foods such as sausages, but need not be. Packagings (empty or filled) can also be transported. However, the disclosure is in principle not restricted in terms of the products conveyed using the diversion device and/or the transport devices.

In order to divert products 130 in their direction of motion that are transported along the first direction of transport in transport device 131, diversion device 100 comprises a first element 101 which is mounted to be rotatable about an axis of rotation $R_1$. The direction of rotation is preferably selected such that the products continue their motion when they are transferred from transport device 131 to diversion device 100.

Furthermore, diversion device 100 comprises a second element that is rotatable about a second axis of rotation $R_2$ and overlaps the first element in a region so that products 130 transported in this region cannot exit the region due to their mass inertia. This region is also referred to as the diversion region.

In the diversion region, products 130 follow the rotation of first element 101 or second element 102, respectively, about the respective axis of rotation, since they are forced onto a circular path due to the centripetal force acting upon them.

In the direction of rotation of the first element and the second element downstream of the diversion region, first element 101 and second element 102 no longer overlap, so that the products can exit the diversion region and in particular the diversion device due to their mass inertia and enter transport device 132.

In particular, the size of the diversion region can be selected such that products can be transferred to element 101 upstream of the diversion region, then enter into the diversion region and are diverted in order to then exit the diversion region in a direction that coincides with the direction of transport of transport device 132. Particularly preferably, a tangent to the outer surface of first element 101 at the end of the diversion region can be parallel to the direction of transport of transport device 132. Since the tangent is parallel to or the same as the direction of motion of the products due to their mass inertia, this ensures that the products exit the diversion device with a direction of motion that corresponds to the direction of transport of transport device 132 arranged downstream.

In order to implement a diversion region that does not extend around the entire diversion device, it is provided that first axis of rotation $R_1$ of first element 101 and second axis of rotation $R_2$ of second element 102 together form an angle α, are in particular not parallel to one another.

In the case of a substantially circular disk-shaped configuration of first element 101 and a substantially cylindrical configuration of second element 102, which preferably engages around first element 101 in the diversion region, this causes the diversion region to extend only over a partial region of the circumference of the first element and the second element. The size of the diversion region depends on the angle formed by first axis of rotation $R_1$ and second axis of rotation $R_2$.

In order to realize the rotation of first element 101 about axis of rotation $R_1$ and of second element 102 about the axis of rotation $R_2$, a separate drive device can be associated with each of the elements. In the view of FIG. 1, drive device 111 is associated with element 101 and drive device 112 is associated with element 102. These drive devices can be electric motors that can be operated and/or controlled independently of one another. In particular, servomotors can be used.

It can expediently be provided that drive devices 111, 112 can be controlled independently of one another, and can be controlled such that the rotational speed of the first element and the rotational speed of the second element match. It can particularly preferably be provided that the angular speeds of the first element and of the second element are the same. Alternatively or in addition, it can be provided that the tangential speeds of the first element and the second element are substantially the same in a region in which a product, which comes into contact with the first element and the second element, is transported between the first element and the second element. This ensures that products which come into contact with first element 101 and second element 102 do not experience any different torques acting upon them, which could lead to an undesired motion of the products.

Figure 2B:
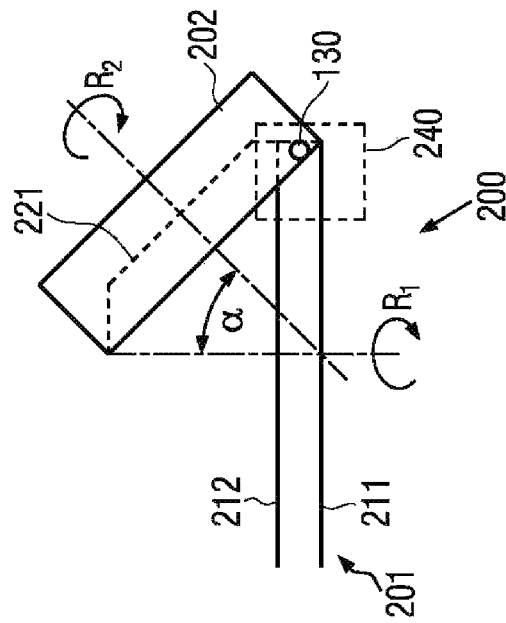
FIGS. 2A and 2B show a top view and a side view of a diversion device according to an embodiment.
Figure 2A:
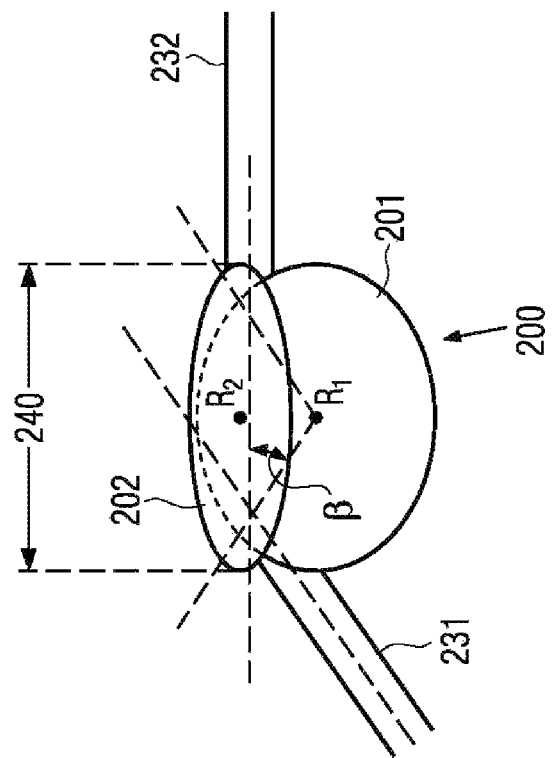

FIGS. 2A and 2B show a top view and a side view of a diversion device from FIG. 1 according to an embodiment.

FIG. 2A shows region 240 in which first element 201 and second element 202 overlap such that a product with a motion along the overlap region thus formed, which is also referred to as diversion region 240, cannot exit this region in a radial direction (viewed from axis of rotation $R_1$ or axis of rotation $R_2$), since such a radial motion of a product is blocked at least in the radial direction by the overlap of the first and the second element.

Disposed upstream, and preferably immediately upstream of the diversion region, in the direction of transport of the products through diversion device 200 is a transfer point at which transport device 231 can supply products to diversion device 200. They can be shot into the diversion region by way of, e.g., a high transport speed in a conveyor belt of transport device 231. Since it is not possible to exit the diversion region due to the overlap of the first and the second element, the products cannot escape as a result.

It is preferably provided that the transport speed of the products in first transport device 231 corresponds to the tangential speed of the products in the diversion region of diversion device 200 and that the transport speed of the products in subsequent transport device 232 also has the same speed. However, this is not mandatory. The transport speed in the subsequent downstream device can preferably each be greater than in the preceding one, so that there is no deceleration and therefore not any collision of products.

FIG. 2B shows a side view of the diversion device without the further transport devices from FIG. 2A. In the embodiment presently shown, first element 201 comprises two circular or circular disk-shaped segments 211, 212 spaced from one another between which, as presently shown, a product 130 can be received to be transported through the diversion device. This configuration is not mandatory. It can also be provided that first element 201 is embodied only as comprising a segment in the shape of a circular disk. The circular disk-shaped segments are preferably spaced apart. However, this is also to comprise that the circular disk-shaped segments can be physically connected to one another, for example, by a connecting element extending about the axis of rotation or the axis of rotation itself.

Two segments 211 and 212 of a circle are arranged concentrically to one another at a distance from one another and are mounted to be rotatable about common axis of rotation $R_1$. The two circular disk segments can be driven, for example, by way of common drive device 111, as shown in FIG. 1. Alternatively, it is also possible to drive both segments 211, 212 independently of one another using separate drive devices.

In the embodiment presently shown, two segments 211, 212 have the same diameter. This is not necessarily the case. One of the segments can also have a smaller diameter than the other segment. In particular with regard to the tilted position of second element 202, it can be useful, for example, to have the diameter of lower segment 211 shown in FIG. 2B be smaller than upper segment 212 so that unimpeded engagement with or engagement around the diversion region can be effected when the inner surface of second element 202 is configured as a truncated cone or as a cone (as shall be explained hereafter).

Diversion region 240 is shown in dashed lines in FIG. 2B. This is preferably to be understood to be the region in which products cannot exit the region enclosed by first element 201 and second element 202, at least not in the radial direction. This region is formed in that second element 202 engages around first element 201 from the outside. This applies regardless of whether first element 201 is formed to comprise two circular disk-shaped segments 211, 212 or to comprise just one such segment or as a different configuration. In particular, diversion region 240 is implemented in that first element 201 extends into the interior of second element 202 in the diversion region.

For this purpose, second element 202 can be configured as a substantially hollow cylinder. The hollow cylinder has an inner surface 221. In some embodiments, it is provided that the latter is implemented as a surface of a truncated cone which is configured to be open towards the bottom (towards its base region having a larger diameter). This can preferably be implemented such that that the axis of symmetry of this truncated cone coincides with axis of rotation $R_2$. The setting angle of the lateral surface of the inner frustoconical surface of second element 202 can be selected such that the lateral surface in the diversion region runs parallel at least in part to axis of rotation $R_1$ or forms an obtuse angle or an acute angle therewith. An obtuse angle, which is greater than 90° but smaller than 180°, can be preferred since this prevents products from getting stuck unintentionally in the diversion region.

Alternatively, the inner surface of second element 202 can also be configured as a cylinder or cylinder surface. The outer surface of this cylinder then extends parallel to axis of rotation $R_2$, so that, when axis of rotation $R_2$ forms angle α presently shown with axis of rotation $R_1$ of first element 201, the inner surface of second element 202 forms an angle of 90°+α with first element 201, which is an obtuse angle in any case, provided that α is an acute angle.

If first element 201 is configured as comprising two circular disk-shaped segments 211, 212, it can be provided that these segments have different diameters, as already described above. In the embodiment presently shown in which the inner surface of second element 202 is configured to be frustoconical and its outer surface extends parallel to axis of rotation $R_1$, it is preferred to have segments 211, 212 have the same diameter since they can then cause, at least in diversion region 240, in which the inner surface of the second element and the first element are disposed closest to each other, the most complete termination or complete upward and downward enclosure of products 130 possible in the diversion region.

Alternatively, it can also be provided that the diameter of upper segment 212 differs from that of lower segment 211, which can be useful in particular when the inner surface of second element 202 is configured as a cylinder surface. In such a case, in order to realize the most complete termination possible or the most complete delimitation of region 240 by two segments 211, 212 and second element 202, the diameter of upper segment 212 can be greater by an amount of 2h/tan α than that of lower segment 211. Where h is the distance between segments 211 and 212 and angle α, when the inner surface of second element 202 is configured as a cylinder jacket, is equal to the angle between axis of rotation $R_2$ and axis of rotation $R_1$. This condition does not have to be met exactly. It can also be provided that the difference between the diameters of segments 211, 212 is 10% less or 20% less than the value specified above. Reliable engagement of the first element and the second element is thus ensured, even with a large angle α.

While the outer shape of second element 202 of FIG. 2B has been described as a cylinder, this is not necessarily the case. The outer surface of second element 202 can also be configured, for example, as a truncated cone or a differently shaped element, as long as the inner surface is configured such that it can enclose diversion region 240 together with first element 201 in order to divert products therein in their direction of motion.

As shown schematically in FIG. 2B, products 130 come into contact with at least part of first element 201 (presently at least lower segment 211) and part of the inner surface of second element 202. When in motion through the diversion region, the products are moved in the radial direction of axis of rotation $R_1$ due to the centrifugal force acting in their inertial system or due to their own inertia, respectively. This motion takes place until the products in the diversion region are prevented by the first element and/or the second element from any further motion in the radial direction.

Since the products can be food, it can be advantageous to have the surface of the first element and the second element that comes into contact with the product comprise a surface that is difficult to be wetted by bacteria and/or contaminants. For example, the surface can be made of or comprise stainless steel. Antibacterial plastics or coatings made thereof are also conceivable for the inner surface of second element 202 and/or for the surface of first element 201 that comes into contact with products. It can also be provided that the entire surface of the first element and the second element, comprising both the inner and the outer surface, is made of stainless steel or is layered therewith.

Figure 3C:
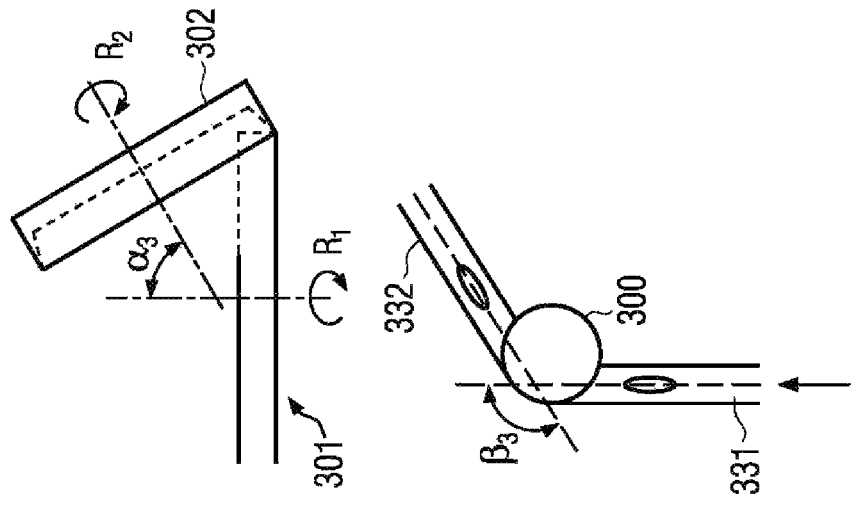
FIGS. 3A-3C show different relative arrangements of the first element and the second element to one another according to an embodiment.
Figure 3B:
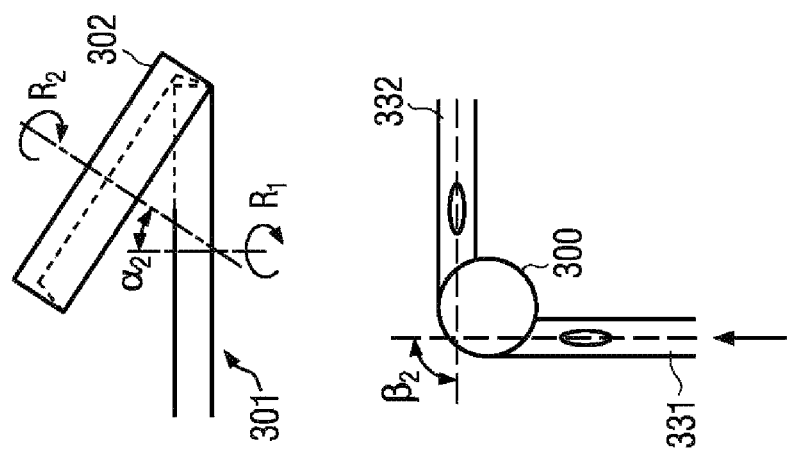
Figure 3A:
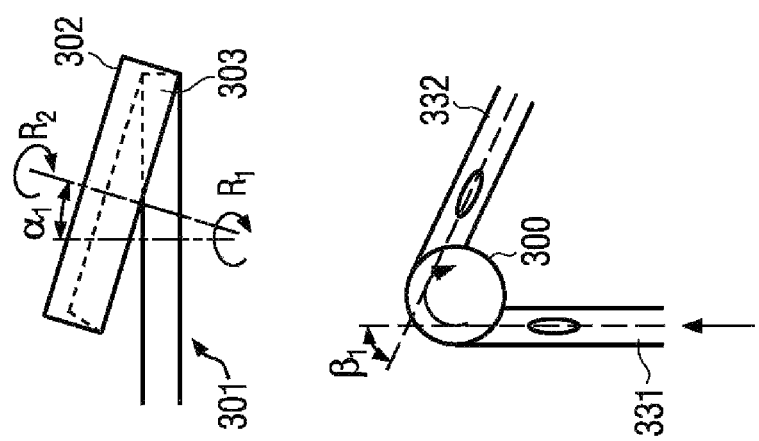

FIGS. 3A to 3C show various relative arrangements of first element 301 and second element 302 to one another as well as associated representations of upstream transport device 331 and downstream transport device 332 and the angle formed by them.

In general, the smaller angle α between axes of rotation $R_1$ and axis of rotation $R_2$, the larger the region enclosed by the first element and the second element and therefore the diversion region measured as a portion of the full circle. This means that the angle formed between the directions of transport of transport devices 331, 332 is also smaller, the smaller angle α.

An embodiment is shown in FIG. 3A in which angle $\alpha_1$ formed between axes of rotation $R_1$ and $R_2$ is small and measures, for example, a few degrees such as 10° or 20°. As a result, first element 301 and second element 302 enclose a comparatively large region 303 such that a product cannot exit this region in the radial direction.

This results in a diversion angle $\beta_1$ which indicates the angle at which the direction of transport of transport device 331 and the direction of transport of transport device 332 are disposed. This angle is comparatively small in FIG. 3A. It also depends in particular on the size of the elements.

In FIG. 3B, angle $\alpha_2$ is greater than angle $\alpha_1$. Angle $\alpha_2$ can presently be selected such that the angle between the supply direction in first transport device 331 and the discharge direction in transport device 332 is exactly 90°. Such configurations can be particularly preferred, since a change in the direction of motion of products by 90° can be advantageous in many applications.

FIG. 3C shows a further embodiment in which angle $\alpha_3$ between axis of rotation $R_1$ and axis of rotation $R_2$ is greater than angle $\alpha_2$. In this case, angle $\beta_3$ formed by the directions of transport is greater than angle $\beta_2$ and also greater than angle $\beta_1$, so that a comparatively small diversion of products is obtained. While such a diversion could still be implemented in a practicable manner by way of V-shaped conveyor belts, the diversion by angle $\beta_3$ can be realized in a comparatively small spatial region by using a diversion device according to this embodiment, which can lead to reductions in the transport distances of the products.

Figure 4:
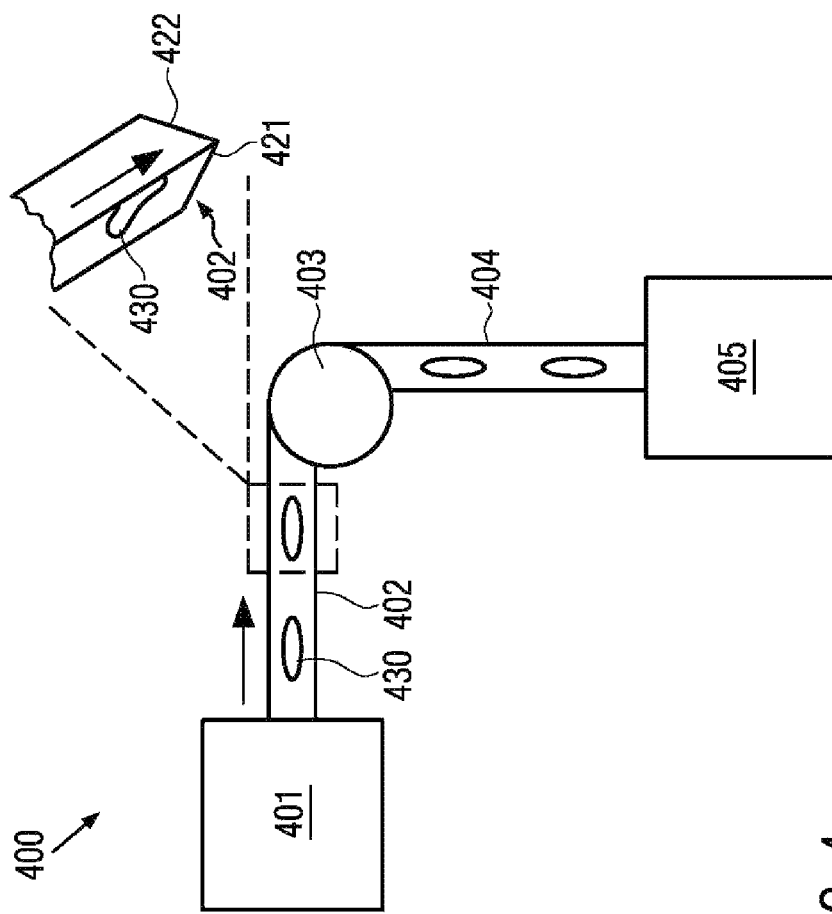
FIG. 4 shows an embodiment of a packaging system.

FIG. 4 shows an embodiment of a packaging system using diversion device 403 in accordance with one of the above embodiments.

Packaging system 400 comprises a treatment machine 401 from which products 430 can be transferred to first transport device 402 upstream of diversion device 403. Treatment machine 401 is not restricted in the type of treatment it performs on products. However, the treatment machine can be in particular a centrifuge.

After the products have been transferred to transport device 402, they are transported in the direction of diversion device 403 according to the direction of the arrow shown. Therein, they are diverted and transferred to second transport device 404. From there, they can be supplied to, for example, a packaging machine or another treatment machine 405.

It is provided by way of example in the embodiment shown in FIG. 4 that first transport device 402 is configured as a V-shaped conveyor belt 402. This V-shaped conveyor belt comprises two conveyor belts 421, 422 which are arranged at an angle to one another so that they enclose a trough in which products 430 can be transported. The angle can be an acute angle or a 90° angle or also an obtuse angle. For example, conveyor belts 421, 422 can form an angle of 90° with one another.

Alternatively, second transport device 404 can also comprise such a V-shaped conveyor belt, or both transport devices 402, 404 can comprise such a V-shaped conveyor belt.

Transport devices 402, 404, however, are not restricted to exclusively comprising conveyor belts and/or in particular V-shaped conveyor belts. Other configurations are presently also conceivable, such as slide rails for products.

Figure 5:
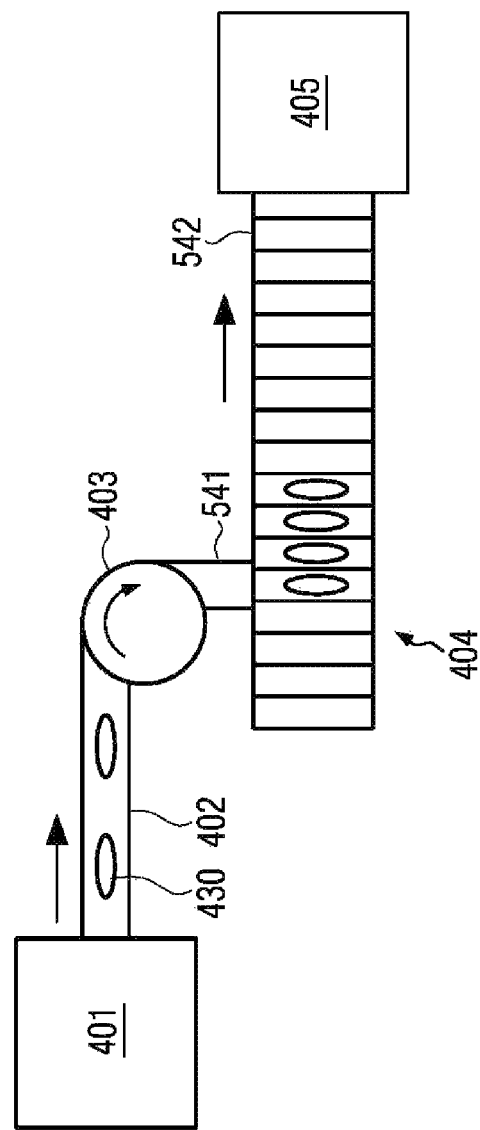
FIG. 5 shows an embodiment of a packaging system as an alternative to FIG. 4.

FIG. 5 shows an embodiment that is modified compared to FIG. 4. First treatment machine 401, first transport device 402, diversion device 403, and second treatment machine 405 can be configured according to FIG. 4 and are presently not described again.

In this embodiment, second transport device 404 comprises downstream of diversion device 403, firstly, a sliding region 541 into which the products are transferred from the diversion device and on which they slide along the second direction of transport. For this purpose, the surface of this sliding region 541 can be made of, for example, polished stainless steel or comprise it. The sliding region can also be inclined downwardly in the direction of transport, for example, in order to avoid the accumulation of products.

Arranged downstream of sliding region 541 is presently a compartmentalized conveyor belt 542 which can receive the products successively from the sliding region. For this purpose, for example, troughs (compartments) separated from one another by elevations can be arranged in the compartmentalized conveyor belt, where the troughs can each receive one or more products. This enables (pre)-portioning to take place. In the embodiment presently shown, the compartmentalized conveyor belt then transports the products in a third direction of transport to treatment machine 405 (in correspondence with the direction of the arrow shown) The third direction of transport preferably forms an angle with the second direction of transport along which products move in the sliding region. The third direction of transport can preferably run transverse to the second direction of transport or be perpendicular thereto.

What is claimed is:

1. A diversion device for a transport device for transporting products, the diversion device comprising a first element mounted to be rotatable about a first axis of rotation and a second element mounted to be rotatable about a second axis of rotation, wherein the axes of rotation form an angle with one another and the first and the second elements overlap in a region so that the first and the second elements enclose a diversion region, wherein a product supplied to the diversion region can be diverted in the diversion region by rotating the first and the second elements and can exit the diversion device after having passed the diversion region due to mass inertia.

2. The diversion device according to claim 1, wherein the first element is circular disk-shaped and the second element comprises an inner frustoconical surface, wherein the first element in the diversion region engages with the frustoconical surface.

3. The diversion device according to claim 2, where the first element comprises two circular disk-shaped segments which are arranged concentrically to one another and spaced from one another along the first axis of rotation and which are mounted to be rotatable about the first axis of rotation, wherein a product can be received between the segments and be transported through the diversion device and wherein the frustoconical surface of the second element encloses the two segments in the diversion region.

4. The diversion device according to claim 2, wherein an angle between the first axis of rotation and a lateral surface of the inner frustoconical surface of the second element in at least a partial region of the diversion region is between 0° and 20°.

5. The diversion device according to claim 2, wherein an angle between the first axis of rotation and a lateral surface of the inner frustoconical surface of the second element in at least a partial region of the diversion region is between 0° and 5°.

6. The diversion device according to claim 1, wherein the first element is drivable to rotate about the first axis of rotation by a first drive device and the second element is drivable to rotate about the second axis of rotation by a second drive device that is independent of the first drive device.

7. The diversion device according to claim 6, wherein the first drive device and the second drive device can drive the first element and the second element at a same rotational speed.

8. The diversion device according to claim 1, wherein the first element and the second element are drivable by a common drive device to rotate about the first axis of rotation and the second axis of rotation, respectively.

9. The diversion device according to claim 1, wherein the first element and/or the second element comprise/comprises a surface made of stainless steel for coming into contact with the product.

10. The diversion device according to claim 1, wherein the diversion region enclosed by the first element and the second element is configured such that a product that enters the diversion region along a supply direction exits the diversion region in a discharge direction, wherein an angle between the supply direction and the discharge direction is between 45° and 135°.

11. The diversion device according to claim 10, wherein the angle between the supply direction and the discharge direction is between 60° and 120°.

12. The diversion device according to claim 10, wherein the angle between the supply direction and the discharge direction is between 85° and 95°.

13. A transport line for transporting products, the transport line comprising a first transport device for transporting products along a first direction of transport, a second transport device for transporting products along a second direction of transport, and the diversion device according to claim 1 arranged between the first and second transport devices, wherein the first transport device can supply products to the diversion device and the diversion device can divert products from the first direction of transport to the second direction of transport and supply them to the second transport device.

14. The transport line according to claim 13, wherein the first transport device and/or the second transport device comprise/comprises a V-shaped conveyor belt.

15. The transport line according to claim 13, wherein the second transport device comprises a sliding region extending along the second direction of transport for receiving products from the diversion device and a compartmentalized conveyor belt downstream of the sliding region, wherein products can pass from the sliding region to the compartmentalized conveyor belt and can be transported in the compartmentalized conveyor belt along a third direction of transport.

16. A packaging system for packaging products, the packaging system comprising a treatment machine for products and a packaging machine for packaging products and the transport line according to claim 13 downstream of the treatment machine and upstream of the packaging machine.

17. The packaging system according to claim 16, wherein the treatment machine is or comprises a centrifuge.

18. A method for transporting products, wherein the products are diverted from a first direction of transport to a second direction of transport by way of the diversion device according to claim 1.

* * * * *